(12) United States Patent
Tetsuka

(10) Patent No.: US 7,677,998 B2
(45) Date of Patent: Mar. 16, 2010

(54) BICYCLE FRONT DERAILLEUR

(75) Inventor: Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 537 days.

(21) Appl. No.: 11/343,206

(22) Filed: Jan. 31, 2006

(65) Prior Publication Data
US 2007/0178998 A1    Aug. 2, 2007

(51) Int. Cl.
    *B62M 9/12*    (2006.01)
(52) U.S. Cl. ............................... 474/82; 474/80
(58) Field of Classification Search ............ 474/80, 474/82; *B62M 009/12*
See application file for complete search history.

(56) References Cited

U.S. PATENT DOCUMENTS

| | | | |
|---|---|---|---|
| 4,078,444 A * | 3/1978 | Huret | ............ 474/82 |
| 4,237,743 A | 12/1980 | Nagano | |
| 4,362,522 A | 12/1982 | Huret | |
| 4,479,787 A | 10/1984 | Bonnard | |
| 4,516,961 A | 5/1985 | Coue | |
| 4,961,720 A | 10/1990 | Juy | |
| 5,624,336 A * | 4/1997 | Kojima | ............ 474/82 |
| 7,048,290 B2 * | 5/2006 | Paquette | ............ 280/252 |
| 2005/0272541 A1 * | 12/2005 | Valle et al. | ............ 474/80 |

FOREIGN PATENT DOCUMENTS

| | | |
|---|---|---|
| EP | 0 718 184 A1 | 6/1996 |
| FR | 2 621 373 A1 | 7/1989 |
| JP | 61-150884 A | 7/1986 |

OTHER PUBLICATIONS

U.S. Appl. No. 10/928,741, filed Aug. 30, 2004, Tetsuka et al.

* cited by examiner

*Primary Examiner*—Robert A Siconolfi
*Assistant Examiner*—Anna Momper
(74) *Attorney, Agent, or Firm*—Global IP Counselors, LLP

(57) ABSTRACT

A bicycle front derailleur includes a base member, a movable member and a linkage assembly. The base member is configured to be fixedly coupled to a bicycle frame. The movable member has a chain guide portion. The linkage assembly is coupled between the base member and the movable member to move the chain guide portion between a retracted position and an extended position. The chain guide portion includes a chain guide element defining a chain path and a movable plate arranged to pivot about a pivot axis relative to the chain guide element in a see-saw movement.

15 Claims, 11 Drawing Sheets

BICYCLE FRONT DERAILLEUR

BACKGROUND OF THE INVENTION

1. Field of the Invention

This invention generally relates to a bicycle front derailleur. More specifically, the present invention relates to a bicycle front derailleur that smoothly and reliably shifts a bicycle chain between the front sprockets of the drive train, and which aggressively shifts the bicycle chain to a larger front sprocket from a smaller front sprocket.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component or part of the bicycle that has been extensively redesigned over the years is the front derailleur. A front derailleur is typically mounted onto the bicycle frame adjacent to the front sprockets to shift the chain laterally between the front sprockets. Many bicycles have two or three front sprockets.

Generally, a front derailleur includes a fixed member non-movably secured to a bicycle frame, and a movable member supported to be movable relative to the fixed member. Typically, the fixed member is a tubular clamping member that is secured to the seat tube. Alternatively, the fixed member is sometimes coupled to the bottom bracket or coupled to a brazed-on mounting structure of the frame. In any case, the movable member typically has a chain guide with a pair of cage plates for contacting and moving a chain laterally between the front sprockets. The movable member is usually biased in a given direction relative to the fixed member by a spring. The movable member is usually moved relative to the fixed member by pulling and/or releasing a shift control cable that is coupled to the front derailleur. The movable member and the fixed member usually are interconnected through a plurality of pivotal links (i.e. a linkage assembly).

One problem with typical front derailleurs is that the chain is not always shifted from the smaller sprocket to the larger sprocket(s) as quickly (aggressively), smoothly and reliably as desired by some riders. Thus, undesirable audible clicking sounds can sometimes occur. Moreover, optimum power transfer from the rider to the bicycle might not be achieved during a front up shift (from smaller sprocket to larger sprocket) of the bicycle chain.

In view of the above, it will be apparent to those skilled in the art from this disclosure that there exists a need for an improved bicycle front derailleur that overcomes the above mentioned problems in the prior art. This invention addresses this need in the art as well as other needs, which will become apparent to those skilled in the art from this disclosure.

SUMMARY OF THE INVENTION

One object of the present invention is to provide a front bicycle derailleur that provides smooth, reliable shifting of the bicycle chain between the front sprockets of the drive train.

Another object of the present invention is to provide a front bicycle derailleur, which shifts the bicycle chain to a larger front sprocket from a smaller front sprocket more quickly (aggressively).

Another object of the present invention is to provide a bicycle front derailleur, which facilitates efficient power transfer from the rider to the bicycle during an up shift of the chain (from a smaller front sprocket to a larger front sprocket).

Yet another object of the present invention is to provide a bicycle front derailleur, which reduces audible noises during an up shift of the chain (from a smaller front sprocket to a larger front sprocket).

Yet still another object of the present invention is to provide front bicycle derailleur that is relatively simple and inexpensive to manufacture and/or assemble.

The foregoing objects can basically be attained by providing a bicycle front derailleur that comprises a base member, a movable member and a linkage assembly. The base member is configured to be fixedly coupled to a bicycle frame. The movable member has a chain guide portion. The linkage assembly is coupled between the base member and the movable member to move the chain guide portion between a retracted position and an extended position. The chain guide portion includes a chain guide element defining a chain path and a movable plate arranged to pivot about a pivot axis relative to the chain guide element in a see-saw movement.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
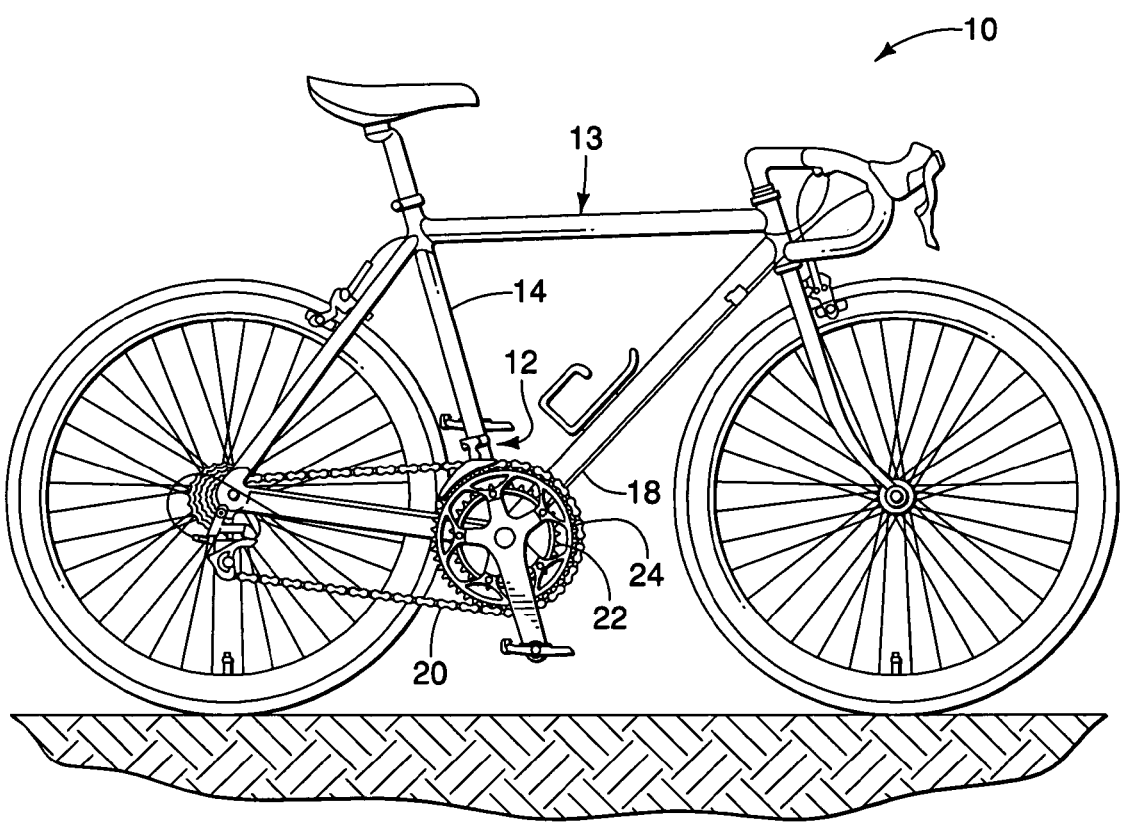
FIG. 1 is a side elevational view of a bicycle equipped with a front derailleur in accordance with a first preferred embodiment of the present invention.
Figure 2:
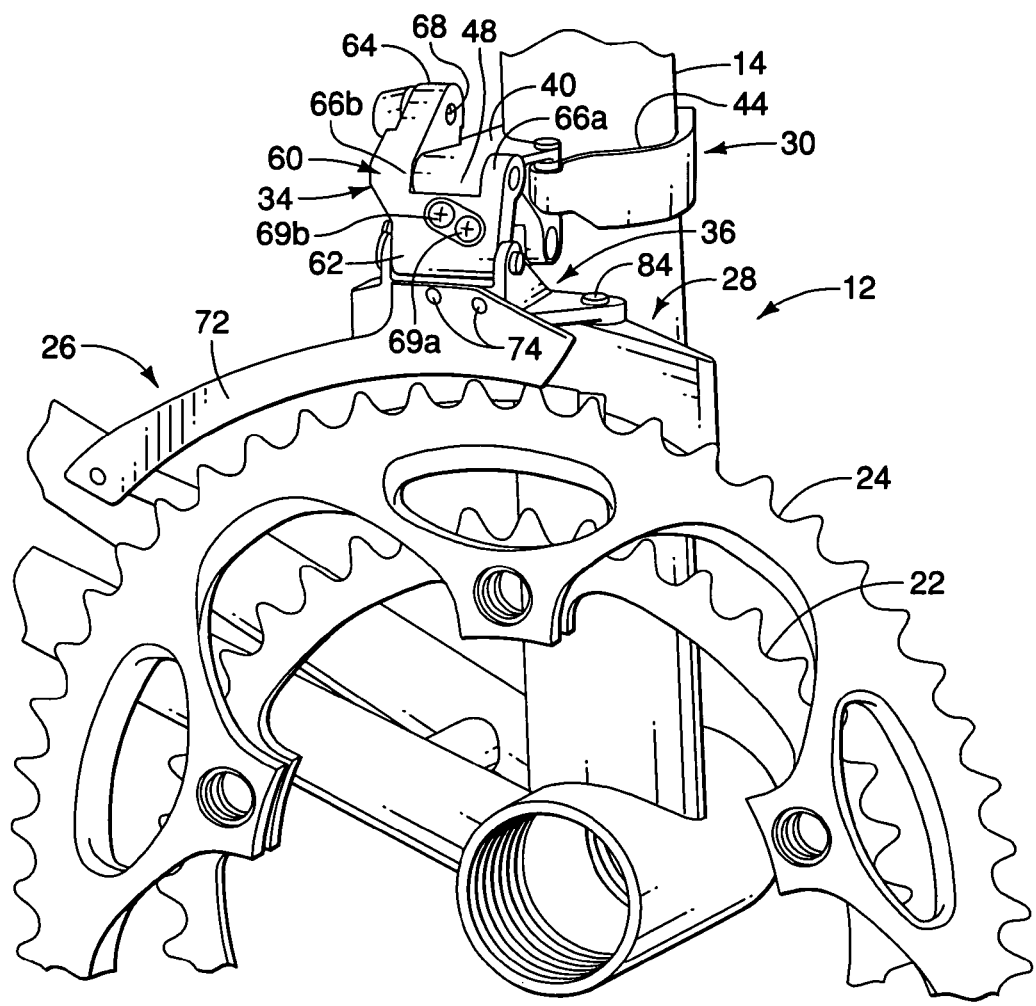
FIG. 2 is an enlarged, outside perspective view of the front derailleur illustrated in FIG. 1.
Figure 3:
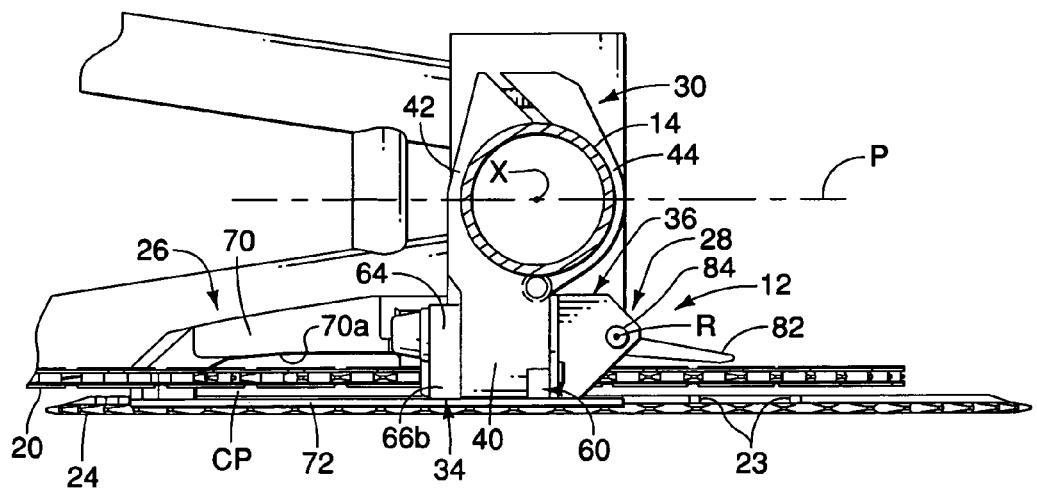
FIG. 3 is a top plan view of the front derailleur illustrated in FIG. 2, with the chain on the smaller front sprocket and the chain guide portion in the retracted position.
Figure 4:
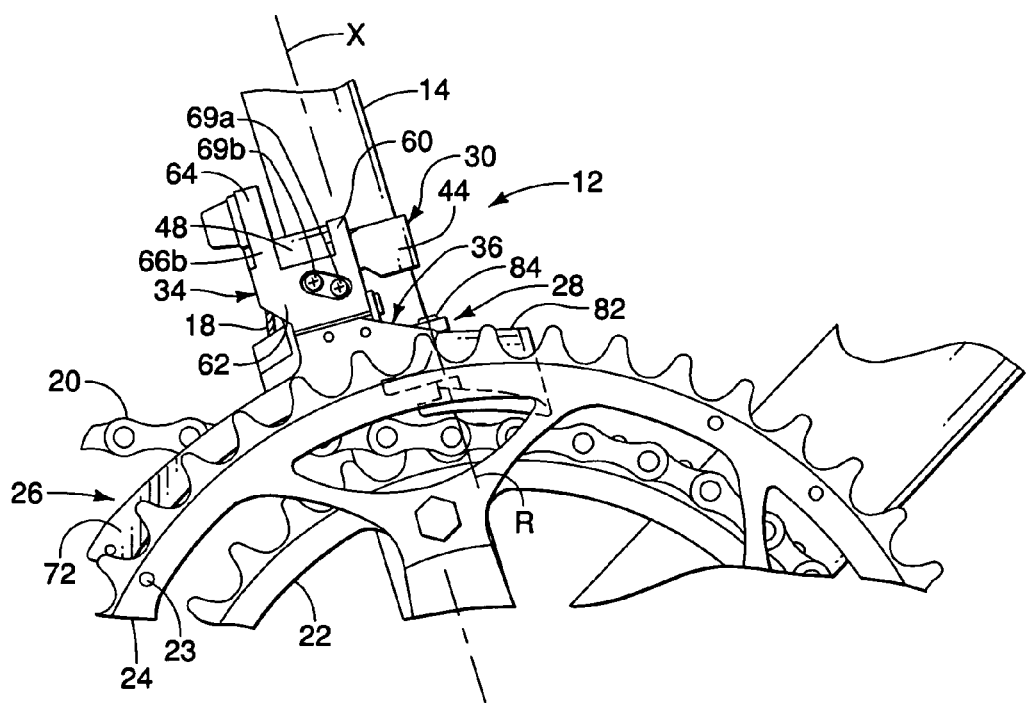
FIG. 4 is a side elevational view of the front derailleur illustrated in FIG. 3.

Referring initially to FIGS. 1 and 2, a bicycle 10 with a front derailleur 12 is illustrated in accordance with a first embodiment of the present invention. Bicycles and their various components are well known in the art, and thus, bicycle 10 and its various components will not be discussed and/or illustrated in detail herein, except for the components that relate to the front derailleur 12 of the present invention. In other words, only the front derailleur 12 and the components that relate thereto will be discussed and/or illustrated in detail herein.

The front derailleur 12 is fixedly coupled to a seat tube 14 of a bicycle frame 13 of the bicycle 10. The front derailleur 12 is operated in a relatively conventional manner using a shifting unit (only rear shown in FIG. 1) to selectively pull/release a shift control cable 18 in order to move a chain 20 between at least two front sprockets 22 and 24 in accordance with the present invention. The shifting unit is conventional.

While the front derailleur 12 is illustrated as a two-stage or two position derailleur that shifts the chain 20 between the two front sprockets 22 and 24, it will be apparent to those skilled in the art from this disclosure that the front derailleur 12 can be used in a drive train with three front sprockets as needed and/or desired. It will be apparent to those skilled in the art from this disclosure that a three position front derailleur designed to shift the chain 20 between three front sprockets in accordance with the present invention would include an innermost retracted position, an intermediate retracted/extended position and an outermost extended position.

The front derailleur 12 is relatively conventional, except that the front derailleur 12 includes a chain guide portion 26 with a chain pushing mechanism 28 configured to move in a see-saw movement relative to the chain guide portion 26 in accordance with the present invention. The pushing mechanism 28 assists in up shifting in accordance with the present invention. The pushing mechanism 28 is preferably a chain activated mechanism that moves relative to the chain guide portion 26, independently of movement of other parts of the front derailleur 12. The pushing mechanism 28 is preferably movably attached to the chain guide portion 26 without being attached to other parts of the front derailleur 12. The pushing mechanism 28 and the chain guide portion 26 will be explained below in more detail.

Figure 16:
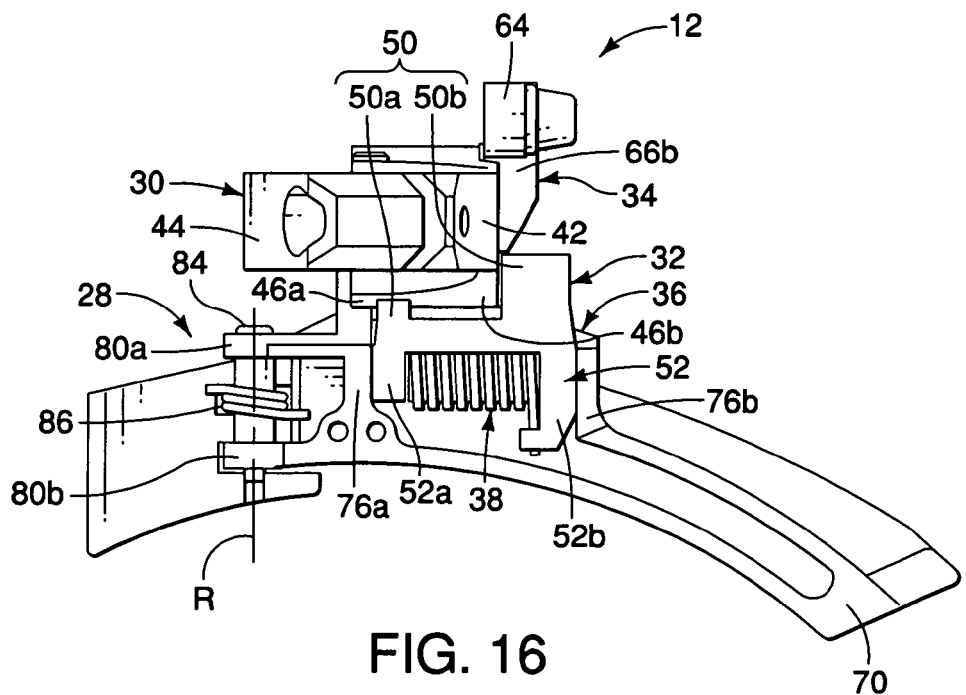
FIG. 16 is an inside elevational view of the front derailleur illustrated in FIGS. 1-15, with the pushing mechanism shown in the shifting or actuating position.
Figure 18:
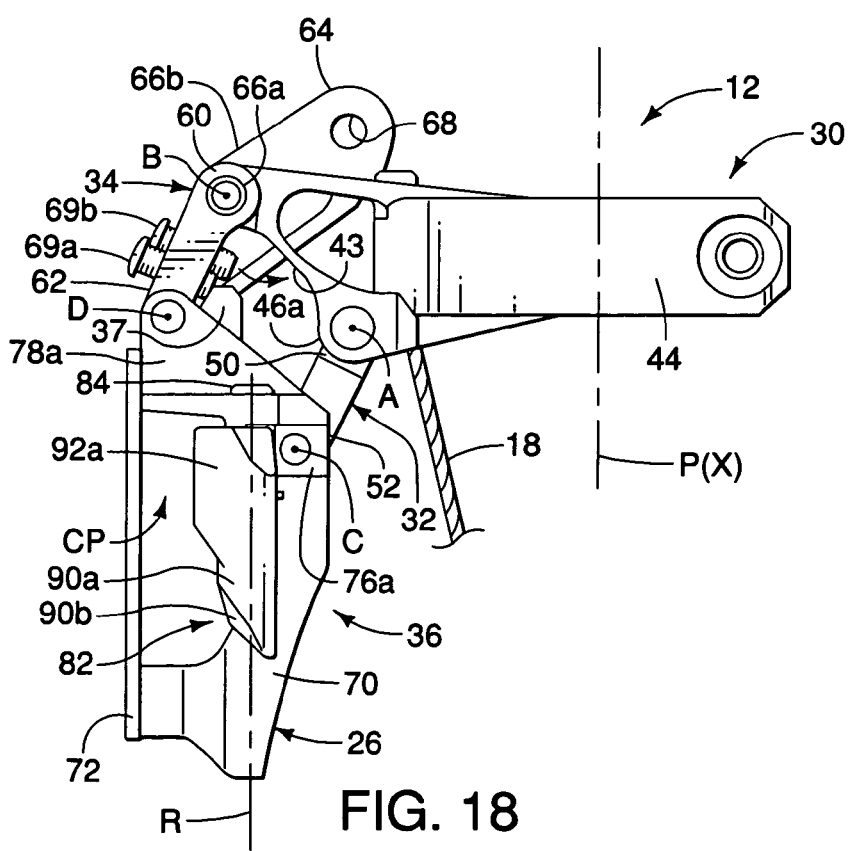
FIG. 18 is a front elevational view of the front derailleur illustrated in FIGS. 1-16, with the pushing mechanism in the actuating (shifting) position.
Figure 19:
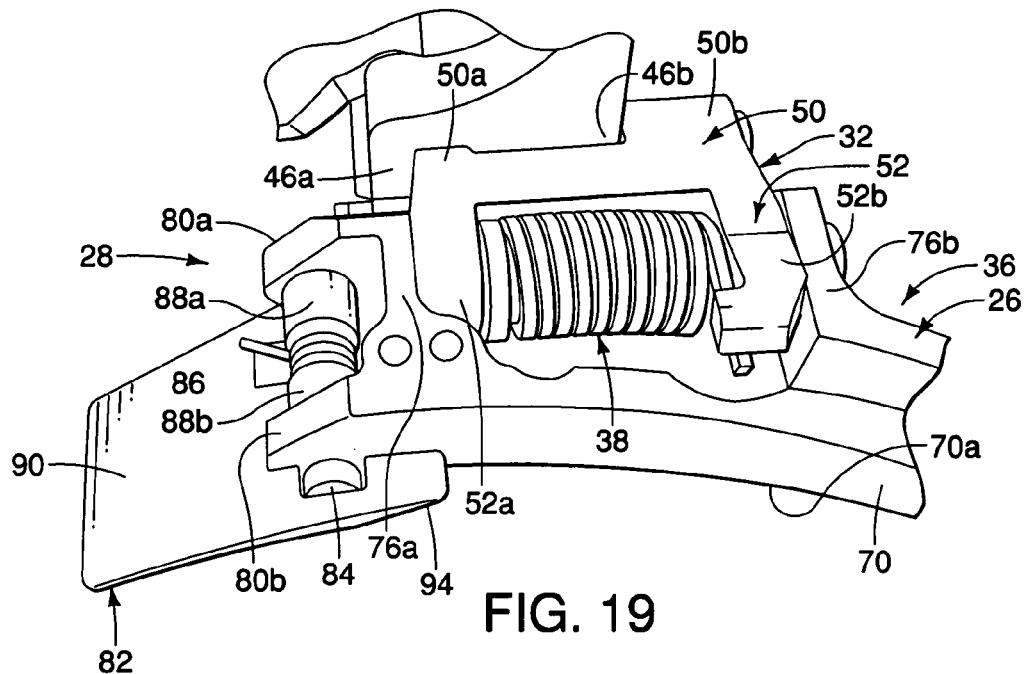
FIG. 19 is an enlarged, partial inside/bottom perspective view of the front derailleur illustrated in FIGS. 1-18.

Referring now to FIGS. 2-19, the front derailleur 12 basically includes a base member 30, an inner link 32, an outer link 34, a movable member 36 and a biasing member 38 as best seen in FIGS. 16 and 19. The base member 30 is fixedly attached to the seat tube 14 of the bicycle frame 13. The inner and outer links 32 and 34 are pivotally coupled to both the base member 30 and the movable member 36 to form a four bar linkage such that the chain guide portion 26 is movable between at least one retracted position and at least one extended position, as best seen in FIGS. 3-12. The movable member 36 has the chain guide portion 26 attached thereto.

Figure 17:
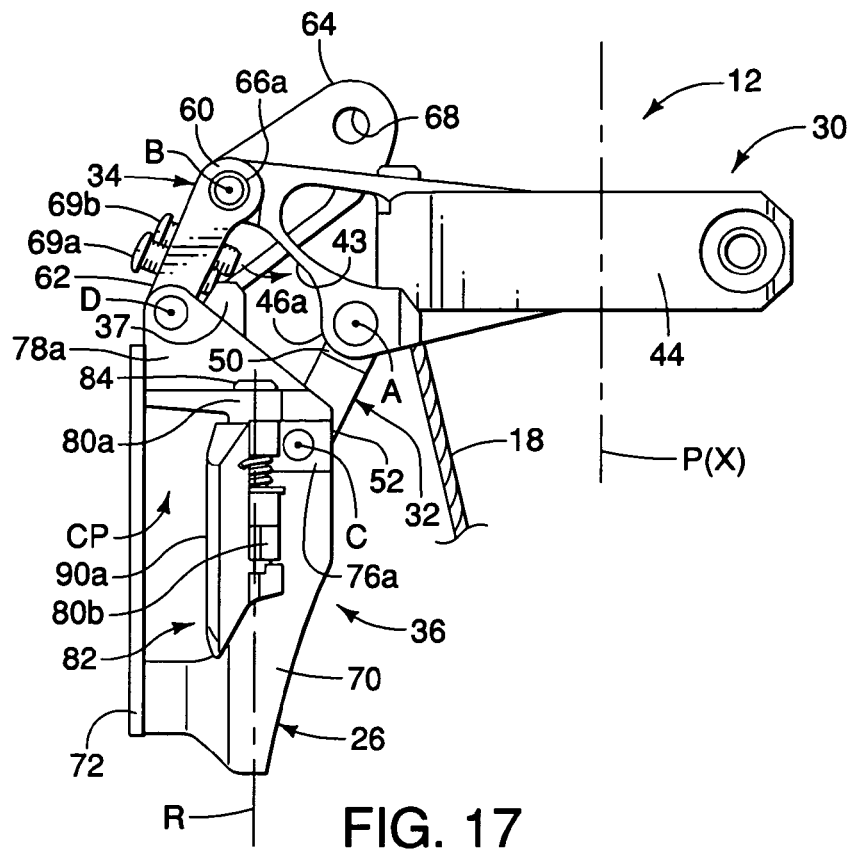
FIG. 17 is a front elevational view of the front derailleur illustrated in FIGS. 1-16, with the pushing mechanism in the normal rest position.

The inner and outer links 32 and 34 are pivotally coupled to the base member 30 at their upper ends to pivot relative to the base member 30 about upper (inner and outer) pivot axes A and B, respectively, as seen in FIGS. 17 and 18. The inner and outer links 32 and 34 are also pivotally coupled to the movable member 36 at their lower ends to pivot relative to the movable member 36 about lower (inner and outer) pivot axes C and D, respectively, as seen in FIGS. 17 and 18. The biasing member 38 is preferably disposed on the pivot axis C. The biasing member 38 is preferably located longitudinally between a pair of flanges of the inner link 32. The biasing member 38 is operatively coupled between the inner link 32 and the movable member 36 to apply an urging force that normally biases the movable member 36 toward the seat tube 14 of the bicycle frame 13 (i.e. toward a center plane P of the bicycle 10). In particular, one end of the biasing member 38 engages the inner link 32, while the opposite end engages the chain guide portion 26. In the illustrated embodiment, the biasing member 38 is a coiled torsion spring.

In the illustrated embodiment, the front derailleur 12 is a down swing type front derailleur. Thus, the movable member 36 moves laterally outward and upwardly relative to the center longitudinal plane P of the bicycle frame 13 when the control cable 18 is pulled by the shifting unit 16, and laterally inward and downward when the control cable 18 is released by the shifting unit 16 in a relatively conventional manner. In other words, the inner and outer links 32 and 34 swing below the pivot axes A and B to form a four bar linkage assembly together with the base member 30 and the movable member 36 of the front derailleur 12 in a relatively conventional manner. Accordingly, the movable member 36 moves laterally to shift the chain 20 laterally between the front sprockets 22 and 24 by operating the shifting unit 16.

The base member 30 basically includes a derailleur support portion 40, a first frame fixing portion 42 and a second frame fixing portion 44. The first frame fixing portion 42 and the derailleur support portion 40 are non-movable relative to each other, while the second frame fixing portion 44 is pivotally coupled relative to the first frame fixing portion 42. The derailleur support portion 40 pivotally supports the inner and outer links 32 and 34. Preferably, the first frame fixing portion 42 and the derailleur support portion 40 are integrally formed together as a one-piece unitary member.

Preferably, the parts of the base member 30 are constructed of lightweight rigid materials such as those materials that are well known in the bicycle art. Specifically, the parts of the base member 30 are preferably constructed of metal utilizing conventional manufacturing techniques such as casting and/or machining. However, it will be apparent to those skilled in the art from this disclosure that some/all of the parts of the base member 30 could be constructed of other materials such as hard, rigid non-metallic materials (e.g., hard plastic) and/or could be constructed using other manufacturing techniques as needed and/or desired. Moreover, it will be apparent to those skilled in the art from this disclosure that the derailleur support portion 40 could be formed separately from the first frame fixing portion 42, as needed and/or desired.

The first and second frame fixing portions 42 and 44 are basically C-shaped tubular clamping members. The first and second frame fixing portions 42 and 44 are pivotally coupled together at one end via a pivot pin and releasably attached together at their opposite ends via a threaded fastener in a conventional manner to clamp the base member 30 onto the seat tube 14. A center frame mounting axis X is formed by the curved inner mounting surfaces of the first and second frame fixing portions 42 and 44, which substantially corresponds to the center axis of the seat tube 14 and lies in the center plane P when coupled to the frame 13. The center frame mounting axis X is substantially coincident with a center axis of the seat tube 14 when the front derailleur 12 is mounted to the seat tube 14 for normal operation.

The derailleur support portion 40 of the base member 30 has the inner and outer links 32 and 34 pivotally coupled thereto, as mentioned above. Specifically, the derailleur support portion 40 includes a pair of inner mounting flanges or attachment elements 46a and 46b (best seen in FIGS. 16-19) and an outer mounting flange or attachment element 48 (best seen in FIG. 2). The inner link 32 is pivotally coupled to the attachment elements 46a and 46b, while the outer link 34 is pivotally coupled to the outer attachment element 48.

The attachment elements 46a and 46b of the derailleur support portion 40 extend downwardly and are substantially parallel to each other. The attachment element 46b is spaced longitudinally rearwardly from the attachment element 46a. Accordingly, a recess is formed between the attachment elements 46a and 46b for pivotally receiving part of the inner link 32 therebetween. Another part of the inner link 32 is located longitudinally rearwardly of the attachment element 46b. The outer (upper) attachment element 48 of the derailleur support portion 40 pivotally supports the outer link 34 at opposite longitudinal ends thereof. Pivot pins or the like are used to pivotally couple the inner and outer links 32 and 34 to the inner attachment elements 46a and 46b and to the outer attachment element 48 in a conventional manner.

Referring still to FIGS. 2-19, the inner link 32 basically includes an upper coupling portion 50 and a lower coupling portion 52 with a transitional portion arranged between the upper and lower coupling portions 50 and 52. The inner link 32 is preferably constructed of a lightweight, rigid material. Specifically, the inner link 32 is preferably constructed of metal as a one-piece, unitary member utilizing conventional manufacturing techniques such as casting and/or machining. However, it will be apparent to those skilled in the art from this disclosure that the inner link 32 could be constructed of other materials and/or could be constructed using other manufacturing techniques as needed and/or desired.

The upper coupling portion 50 of the inner link 32 includes a pair of upper coupling flanges 50a and 50b, while the lower coupling portion 52 also includes a pair of lower coupling flanges 52a and 52b, as best seen in FIGS. 16-19. Thus, the inner link generally has an H-shape, as seen in FIG. 16. The coupling flange 50b is located rearwardly of the coupling flange 50a to form a space therebetween. The attachment element 46b is pivotally received in the space between the upper coupling flanges 50a and 50b, while the coupling flange 50a is received in the space between the attachment elements 46a and 46b. A pivot pin or the like extends through holes (not shown) formed in the attachment elements 46a and 46b, and the upper coupling flanges 50a and 50b to pivotally couple the upper coupling portion 50 to the base member 30 using the inner attachment elements 46a and 46b. The lower coupling portion 52 of the inner link 32 is pivotally coupled to the movable member 36, as explained below. The biasing member 38 is arranged between the lower coupling flanges 52a and 52b. One end of the biasing member 38 engages a projection of the coupling flange 52b, while the other end engages the chain guide portion 26 of the movable member 36, as explained below. The upper coupling portion 50 is preferably shaped to selectively contact a free end of an adjustment screw that is mounted to the outer link 34, as also explained below.

Referring still to FIGS. 2-19, the outer link 34 basically includes an upper coupling portion 60, a lower coupling portion 62 and a cable attachment portion 64 extending from the upper coupling portion 60. The outer link 34 is preferably constructed of a lightweight, rigid material. Specifically, the outer link 34 is preferably constructed of metal as a one-piece, unitary member utilizing conventional manufacturing techniques such as casting and/or machining. However, it will be apparent to those skilled in the art from this disclosure that the outer link 34 could be constructed of other materials and/or could be constructed using other manufacturing techniques as needed and/or desired.

The upper coupling portion 60 of the outer link 34 is pivotally coupled to the outer (upper) attachment element 48 of the base member 30, while the lower coupling portion 62 of the outer link 34 is pivotally coupled to the movable member 36. The upper coupling portion 60 is preferably wider (thicker) than the lower coupling portion 62, as measured in the longitudinal direction of the bicycle 10. The cable attachment portion 64 of the outer link 34 extends upwardly from the upper coupling portion 60, and is configured to have the control cable 18 fixedly coupled thereto via a cable attachment device in a conventional manner. Thus, when the control cable 18 is pulled/released, the outer link 34 will rotate about the pivot axis B to move the movable member 36 laterally relative to the base member 30.

The upper coupling portion 60 of the outer link 34 includes a pair of longitudinally spaced parallel (front and rear) mounting flanges or attachment elements 66a and 66b that are configured to pivotally receive the outer attachment element 48 of the base member 30 longitudinally therebetween. The lower coupling portion 62 of the outer link 34 is pivotally coupled to the movable member 36. The cable attachment portion 64 is narrower (thinner) than both the upper coupling portion 60 and the lower coupling portion 62 in the longitudinal direction of the bicycle 10. The cable attachment portion 64 extends from the rearward side of the upper coupling portion 60 (i.e., from the rear mounting flange 66b). The cable attachment portion 64 basically includes a threaded through bore 68 configured to have the cable fixing device mounted thereto in a conventional manner, as mentioned above.

A pair of threaded adjustment holes (not shown) are formed in the outer link 34. A pair of adjustment screws or bolts 69a and 69b are received in the pair of threaded adjustment holes (not shown) to control the range of movement of the inner and outer links 32 and 34, and thus, the movement movable member 36. The adjustment screw 69a is a top adjustment screw that selectively contacts a projection 37 of the movable member 36 when the front derailleur 12 is in the top shift position, while the adjustment screw 69b is a low adjustment screw that selectively contacts a control surface 43 of the derailleur support portion 40 when the front derailleur is in the low shift position. Thus, the adjustment screws 69a and 69b can be rotated to adjust their positions such that their free ends selectively contact the projection 37 of the movable member 36 or the control surface 43 of the derailleur support portion 40 (of the base member 30), respectively, to control the range of movement of the movable member 36, in a relatively conventional manner. Specifically, the rearward most (low) adjustment screw 69b can be adjusted to selectively contact the control surface 43 of the derailleur support portion 40 of the base member 30 when the chain guide portion is moved to the retracted position, while the forward most (top) adjustment screw 69a can be adjusted to selectively contact the projection 37 of the movable member 36 (best understood from FIGS. 17 and 18) when the chain guide portion 26 is moved to the extended position. The small arc-shaped arrow in FIGS. 17 and 18 illustrate the direction of movement of the low adjustment screw 69b toward the control surface 43 during movement of the front derailleur 12 from the extended (top) position to the retracted (low) position.

Referring still to FIGS. 2-19, the movable member 36 in accordance with the present invention will now be discussed in more detail. The movable member 36 basically includes an inner chain guide element 70, an outer chain guide element 72 and the pushing mechanism 28. Preferably, the inner and outer chain guide elements 70 and 72 are each constructed of a lightweight rigid material such as a metallic material in a conventional manner (e.g., by machining, casting and/or by bending a rigid sheet material) to form the desired shape. The inner and outer chain guide elements 70 and 72 are each preferably constructed by casting and/or machining a single piece of metallic material. The inner and outer guide elements 70 and 72 are fixedly, non-movably coupled together to form a chain receiving space or slot therebetween that defines a longitudinal chain path CP. In other words, each of the chain guide elements 70 and 72 at least partially defines the chain path CP in a longitudinal area adjacent thereto. The pushing mechanism 28 is preferably pivotally attached to the inner chain guide element 70.

The inner chain guide element 70 is fixedly attached to the outer chain guide element 72 using a pair of fasteners 74 (best seen in FIG. 2). The fasteners 74 can be threaded bolts, rivets or the like. The inner chain guide element 70 includes a pair of inner (lower) mounting flanges 76a and 76b, a pair of outer (upper) mounting flanges 78a and 78b and a pair of forward mounting flanges 80a and 80b. The inner mounting flanges 76a and 76b extend laterally inwardly toward the center plane P, while the outer mounting flanges 78a and 78b extend upwardly to form a mounting portion of the movable member 36. The forward mounting flanges 80a and 80b have the pushing mechanism 28 mounted thereto, as explained in more detail below. The inner chain guide element 70 is further shaped, configured and arranged to accommodate moving part(s) of the pushing mechanism 28.

The inner mounting flanges 76a and 76b have the lower coupling portion 52 of the inner link member 32 pivotally coupled therebetween for rotation about the pivot axis C, while the outer mounting flanges 78a and 78b have the lower coupling portion 62 of the outer link member 34 pivotally coupled therebetween for rotation about the pivot axis D. Pivot pins or the like are used to couple the inner and outer link members 32 and 34 to the mounting flanges 76a and 76b, and to the mounting flanges 78a and 78b, respectively, in a conventional manner. The biasing member 38 is preferably a coiled torsion spring that is mounted on the pivot pin coupling the lower coupling portion 52 to the inner mounting flanges 76a and 76b.

Referring to FIGS. 2-21, the chain pushing mechanism will now be explained in more detail. The pushing mechanism 28 basically includes a movable (see-saw) plate 82, a pivot pin 84 and a biasing element 86. The movable plate 82 is pivotally supported on the pivot pin 84 to pivot about a pivot axis R. The pivot axis R extends in a substantially vertical direction relative to the bicycle frame 13 when the base member 30 is fixedly coupled to the seat tube 14 of the bicycle frame 13. Specifically, the pivot axis R is preferably parallel to the center frame mounting axis X, which substantially corresponds to the center axis of the seat tube 14 and lies in the center plane P when the base member 30 is attached to the frame 13. The pivot axis R is located longitudinally in front of the center frame mounting axis X, preferably about 18 millimeters in front of the center frame mounting axis X, as measured in a direction parallel to the center plane P.

Figure 9:
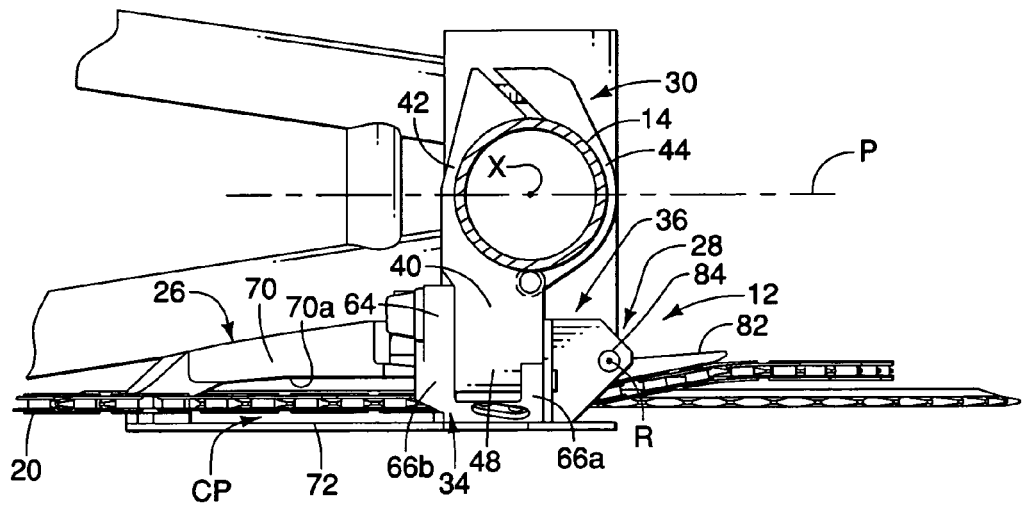
FIG. 9 is a top plan view of the front derailleur illustrated in FIG. 2, with the chain partly shifted to the larger front sprocket by the pushing mechanism (i.e., with the chain guide portion still in the shifted/extended position but with the pushing mechanism in an actuating or shifting position to partly shift the chain)
Figure 10:
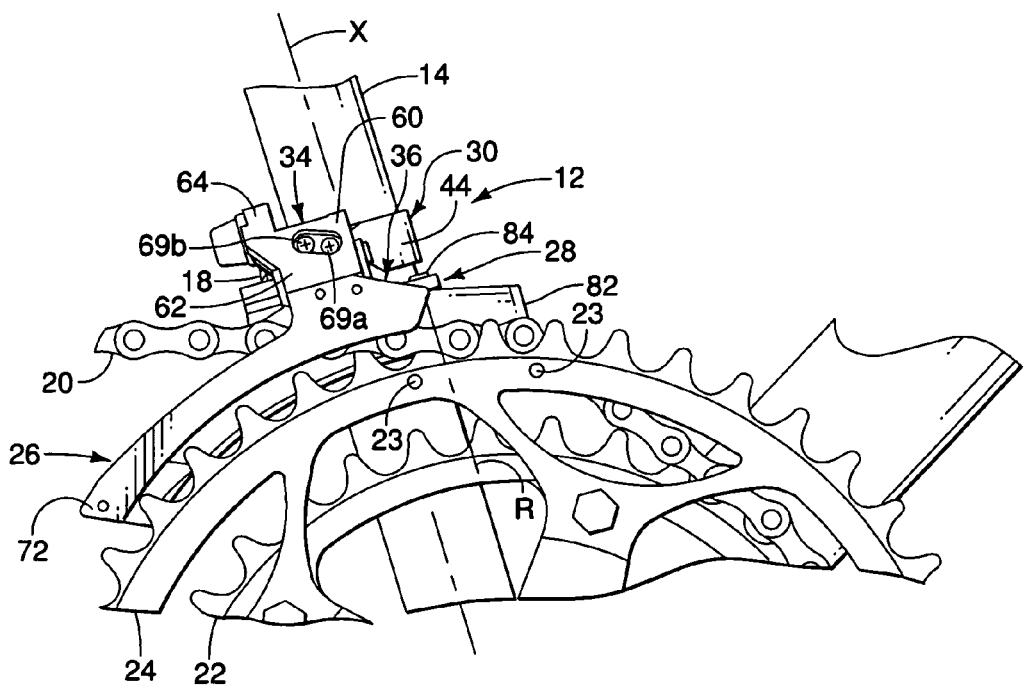
FIG. 10 is a side elevational view of the front derailleur illustrated in FIG. 9.
Figure 13:
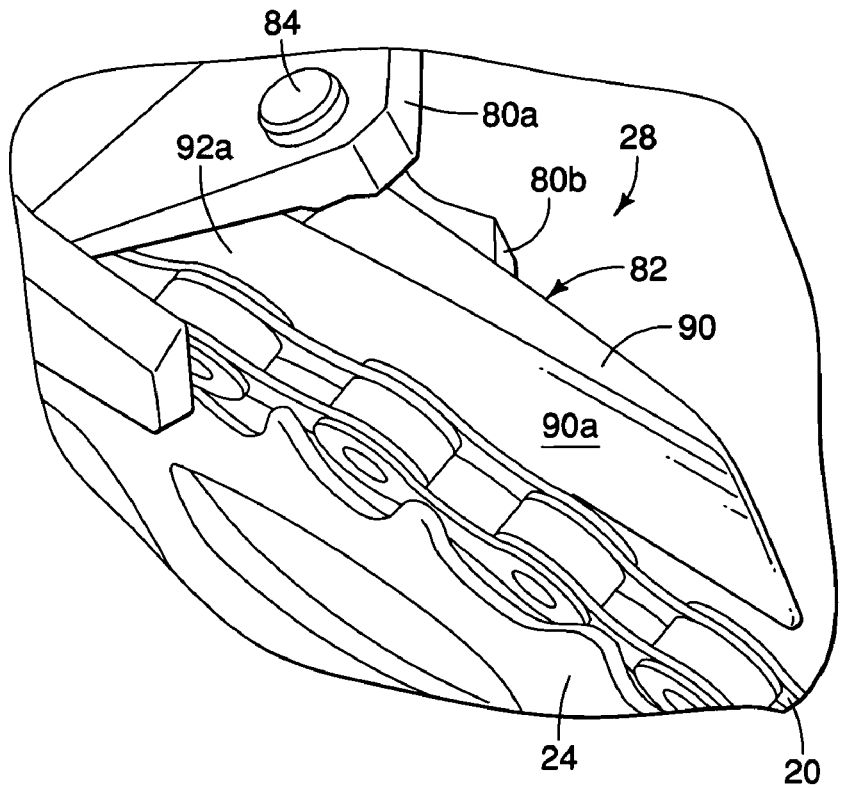
FIG. 13 is an enlarged, partial front perspective view of the front derailleur illustrated in FIGS. 1-12, with the pushing mechanism arranged in the shifting position as shown in FIGS. 9 and 10.
Figure 14:
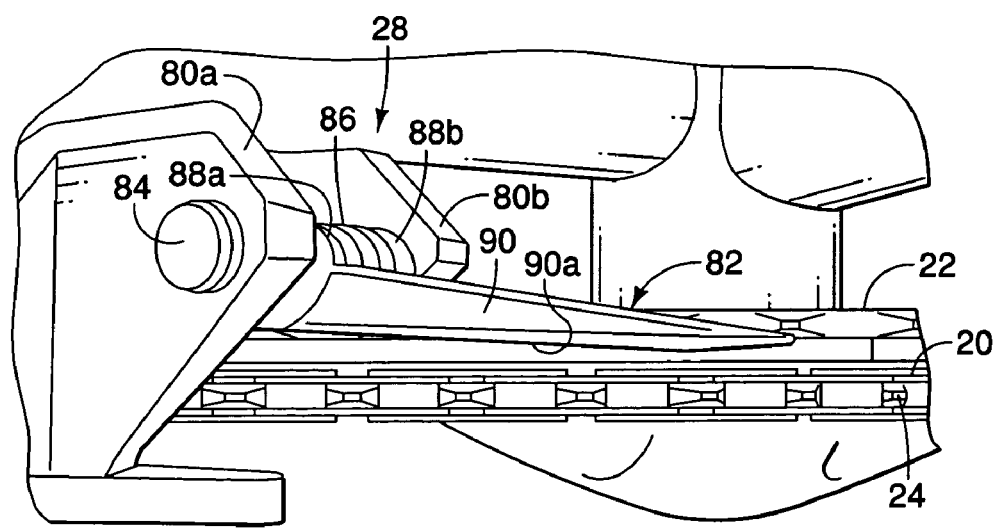
FIG. 14 is an enlarged, partial top perspective view of the front derailleur illustrated in FIGS. 1-12, with the pushing mechanism arranged in the normal rest position after an up shift as shown in FIGS. 11 and 12.
Figure 15:
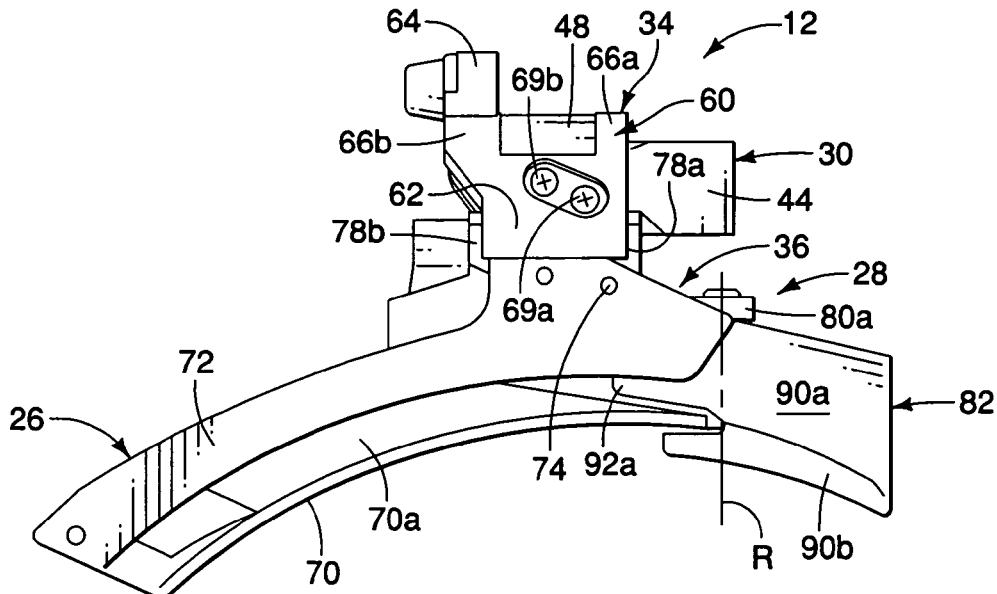
FIG. 15 is an outside elevational view of the front derailleur illustrated in FIGS. 1-14, with the pushing mechanism shown in the normal rest position.

The pivot pin 84 is attached to forward mounting flanges 80a and 80b via a retaining ring, a press fit or the like. The movable plate 82 is supported by the pivot pin 84 in the area between the forward mounting flanges 80a and 80b. The biasing element 86 is preferably operatively coupled between the movable plate 82 and the inner chain guide element 70 to normally bias the movable plate 82 to a normal rest position, as best seen in FIGS. 3, 5, 7, 11, 14 and 17. The movable plate 82 is moved against the biasing force of the biasing element 86 by contacting the chain 20 during an up shift to move to an actuated (moved, shifted) position to assist in shifting the chain 20 to the larger sprocket 24 from the smaller sprocket 22, as best seen in FIGS. 9, 13 and 18.

The movable (see-saw) plate 82 basically includes a mounting portion 88, a first leg portion 90, a second leg portion 92 and a control portion 94. The movable plate 82 moves back and forth during use in a see-saw movement, as best understood from FIGS. 7, 9, 11, 13, 14, 17 and 18. Preferably, the mounting portion 88, the first leg portion 90, the second leg portion 92 and the control portion 94 are integrally formed together as a one-piece, unitary member from a lightweight, rigid material. For example, the movable plate 82 is preferably constructed of metal as a one-piece, unitary member utilizing conventional manufacturing techniques such as casting and/or machining. However, it will be apparent to those skilled in the art from this disclosure that the movable plate 82 could be constructed of other materials and/or could be constructed using other manufacturing techniques as needed and/or desired.

The mounting portion 88 includes an upper flange 88a and a lower flange 88b spaced downwardly from the upper flange 88a. The biasing element 86 is preferably a coiled torsion spring that is mounted on the pivot pin 84 in the area between the upper and lower flanges 88a and 88b when assembled. The upper and lower flanges 88a and 88b are arranged below and above the forward mounting flanges 80a and 80b, respectively. In other words, upper and lower flanges 88a and 88b of the mounting portion 88 are arranged between forward mounting flanges 80a and 80b.

Figure 20:
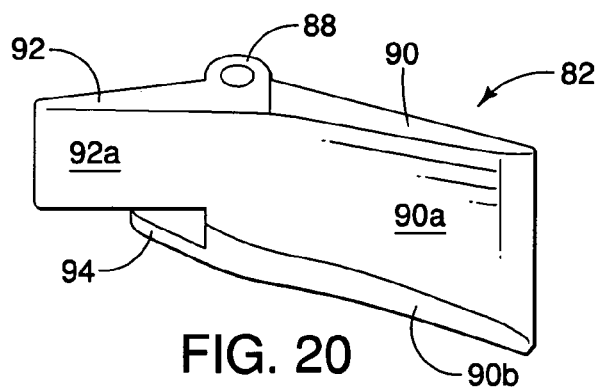
FIG. 20 is an enlarged, outside/upper perspective view of the movable (see-saw) plate of the pushing mechanism of the front derailleur illustrated in FIGS. 1-19.
Figure 21:
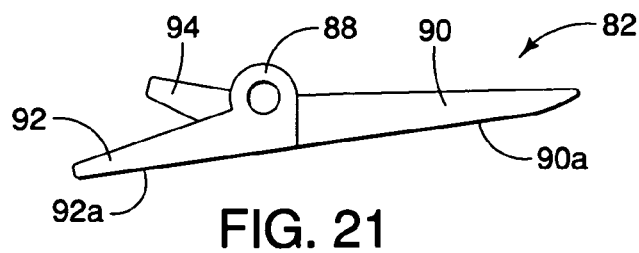
FIG. 21 is a top plan view of view of the movable (see-saw) plate illustrated in FIG. 20.

The first and second leg portions 90 and 92 extend in substantially opposite directions from the mounting portion 88. The first leg portion 90 includes a first chain contact surface 90a, while the second leg portion 92 includes a second chain contact surface 92a. The first leg portion 90 is both longer and wider than the second leg portion 92, as best seen in FIG. 20. In particular, the first surface 90a of the movable plate 82 is wider than the second surface 92a as measured in a direction parallel to the pivot axis R of the movable plate 82, while the first surface 90a of the movable plate 82 is longer than the second surface 92a as measured in a direction perpendicular to the pivot axis R of the movable plate 82.

The first and second chain contact surfaces 90a and 92a are preferably substantially flat, and substantially aligned with each other. In the illustrated embodiment, the first and second chain contact surfaces 90a and 92a are co planar surfaces that are connected to define parts of continuous, single, flat inside surface of the movable plate 82. Thus, the first surface 90a and the second surface 92a of the movable plate 82 are arranged and configured such that the second surface 92a moves towards a center of the chain path CP when the first surface 90a is moved away from the center of the chain path CP. The movable plate 82 is normally biased about the pivot axis R to a normal rest position in which the first surface 90a is disposed closer to the center of the chain path CP than the second surface 92a.

The first leg portion 90 further includes a slanted chain guide surface 90b that tapers from the first chain contact surface 90a in a direction away from the center of the chain path CP relative to the first chain contact surface 90a. The chain guide surface 90b is configured and arranged to guide the chain 20 upwardly into contact with the first chain contact surface 90a during an up shift, as explained below in more detail. Due to the increased width of the first leg portion 90, the chain 20 will contact the slanted chain guide surface 90b during an up shift prior to contacting any other part of the movable plate 82.

In the illustrated embodiment, the movable plate 82 is coupled in a non-cable operated arrangement. In other words, the movable plate 82 is separated from the base member 30 and the linkage assembly such that the movable plate 82 moves independently of movement of the linkage assembly. Specifically, the movable plate 82 moves against the biasing force of the biasing element 86 from the initial rest position due to contact with the chain 20 (i.e., the movable plate 82 is chain activated), and back to the initial rest position under the biasing force of the biasing element 86 when not prevented by contact with the chain 20.

The inner chain guide element 70 has a chain shift or contact surface 70a that faces the outer chain guide element 72, and a recessed area (not shown that receives the second leg portion 92 when the pushing mechanism 28 is in the normal rest position to limit movement of the movable plate 82 in the normal rest position. The chain 20 limits movement of the movable plate 82 beyond the actuating position. The first surface 90a of the movable plate 82 is arranged to at least partially protrude into the chain receiving space from the chain shift surface 70a when located in an initial rest position. The second surface 92a of the movable plate 82 is arranged to be at least partially aligned with the chain shift or contact surface 70a of the inner chain guide element 72 or spaced out (i.e., laterally inwardly) of the chain receiving space when in the initial rest position.

Referring again to FIGS. 3-12, operating of the chain pushing mechanism 28 during an up shift of the chain 20 from the smaller sprocket 22 to the larger sprocket 24 will now be explained in more detail. When the rider desires an up shift of the chain 20 from the smaller sprocket 22 to the larger sprocket 24, the rider operates the conventional shift control mechanism (not shown) to pull the inner wire of the shift control cable 18. When the wire is pulled, the front derailleur 12 will first move from the retracted (low) shift position illustrated in FIGS. 3 and 4 to the intermediate position illustrated in FIGS. 5 and 6. At the intermediate position, the chain shift or contact surface 70a of the inner chain guide element 70 will contact the chain 20 and begin to move the chain 20 laterally outwardly toward the larger sprocket 24. The chain pushing mechanism 28 will remain in the normal rest position during this movement because the chain 20 is located below the movable plate 82.

Figure 5:
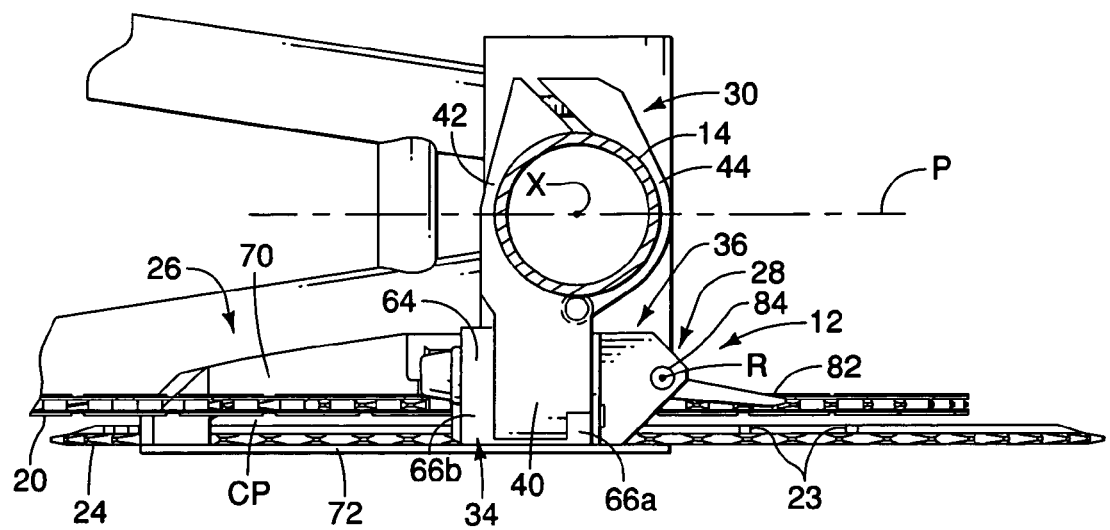
FIG. 5 is a top plan view of the front derailleur illustrated in FIG. 2, with the chain on the smaller front sprocket and the chain guide portion moved to an intermediate position from the retracted position.
Figure 6:
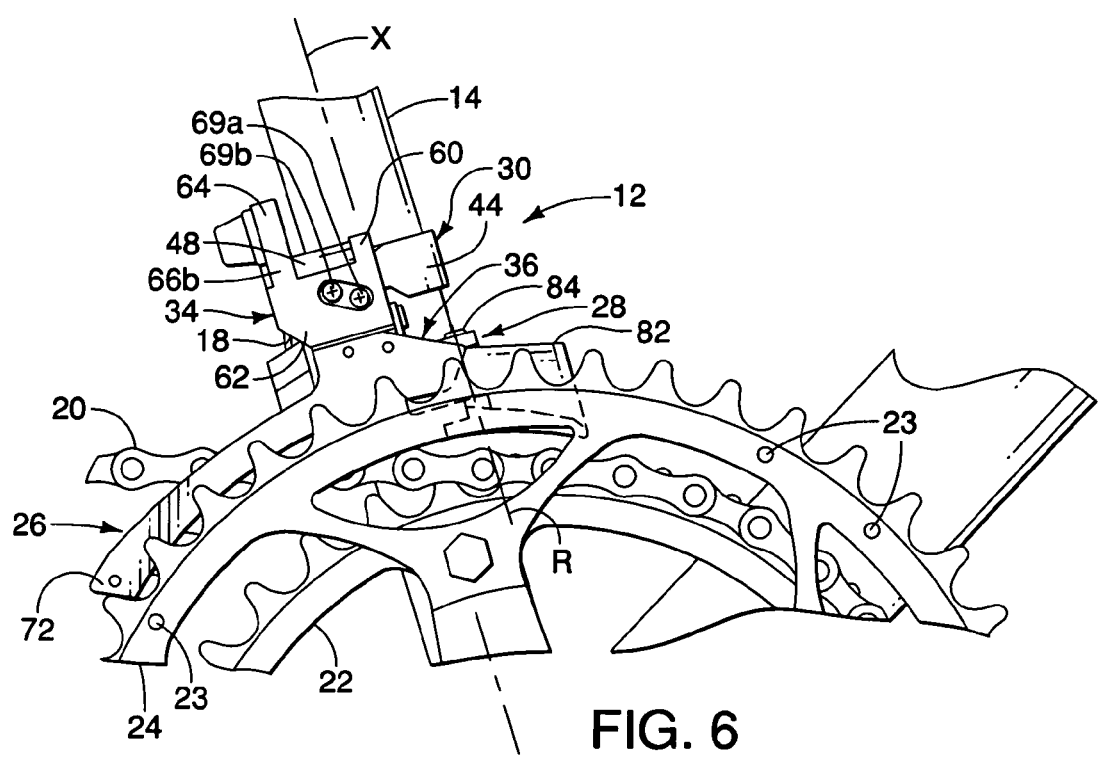
FIG. 6 is a side elevational view of the front derailleur illustrated in FIG. 5.
Figure 7:
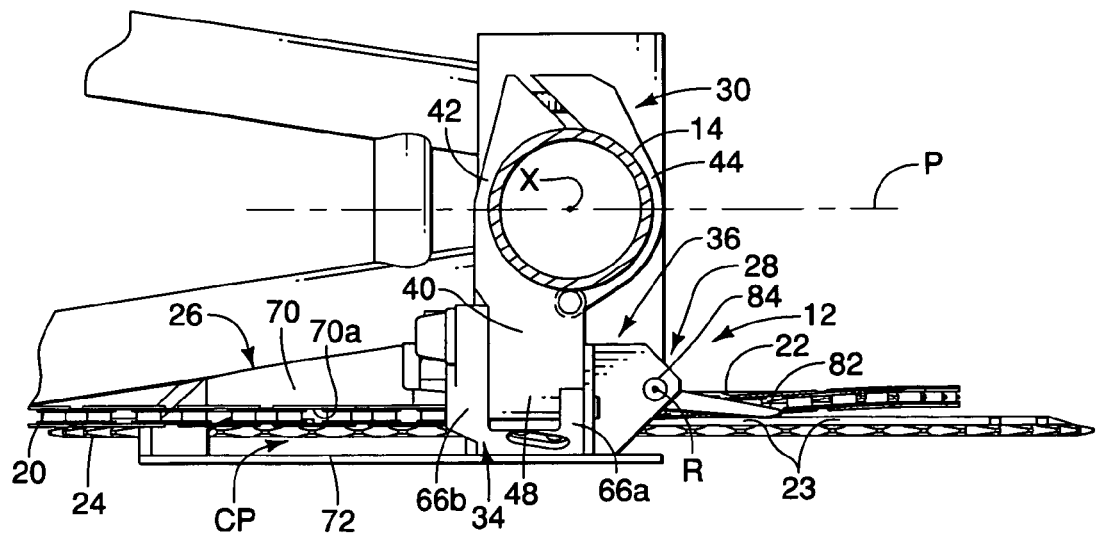
FIG. 7 is a top plan view of the front derailleur illustrated in FIG. 2, with the chain partially on the smaller front sprocket and being lifted by a protrusion of the larger sprocket, and the chain guide portion moved to a shifted/extended position from the intermediate position but with the pushing mechanism still in a normal rest position.
Figure 8:
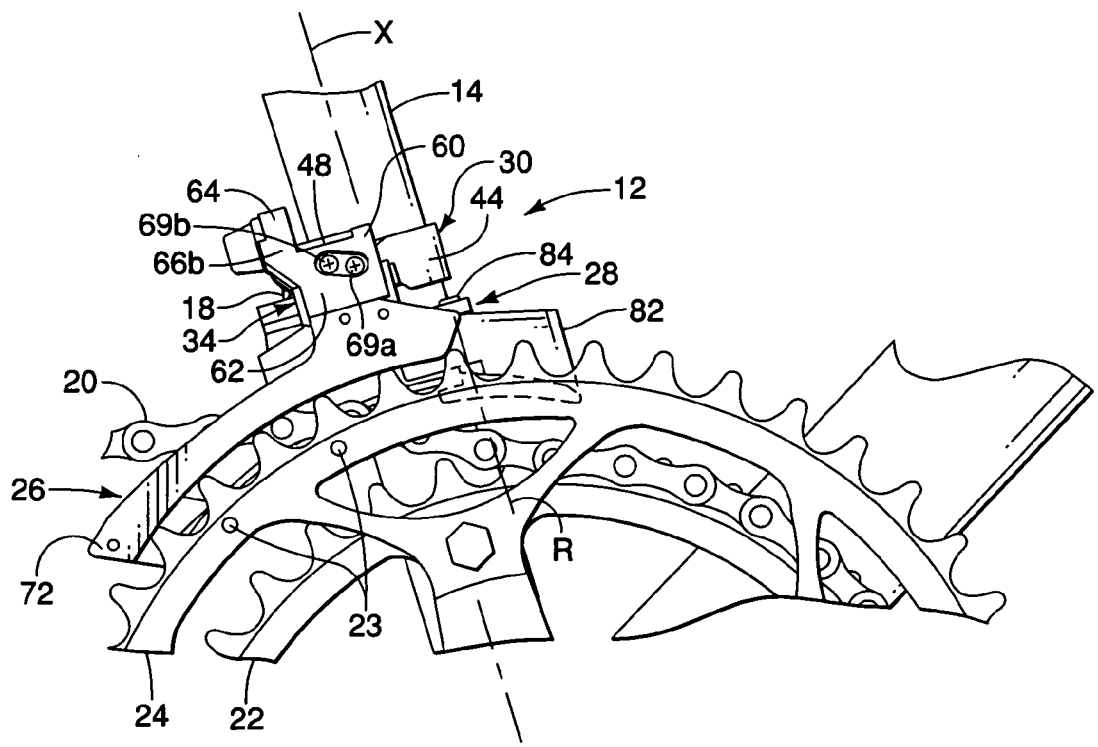
FIG. 8 is a side elevational view of the front derailleur illustrated in FIG. 7.

The chain guide portion 26 will then continue moving laterally outwardly from the intermediate position illustrated in FIGS. 5 and 6 to a shifted/extended position illustrated in FIGS. 7 and 8. At the shifted/extended position, the chain 20 will initially be located adjacent the inner side of the larger sprocket 24, as shown in FIGS. 7 and 8. The chain pushing mechanism 28 will still remain in the normal rest position during this movement because the chain 20 is still located below the movable plate 82.

The larger sprocket 24 is provided with shift assist projections 23 that project laterally inwardly toward the smaller sprocket 22 from inner side of the larger sprocket 24. The projections 23 are relatively conventional, except for the manner in which the projections cooperate with the chain pushing mechanism 28. The chain 20 will remain adjacent the inner side of the larger sprocket 24 (i.e., at the position illustrated in FIGS. 7 and 8) until the chain 20 is grabbed and lifted by one of the projections 23. During shifting, the rider continuously pedals such that the sprockets 22 and 24 continue rotating and cycling the chain 20 in a conventional manner. Thus, when the chain guide portion 26 and the chain 20 are located in the positions illustrated in FIGS. 7 and 8, one of the projections 23 will (eventually) begin to lift the chain 20 upwardly.

When the chain 20 is lift upwardly by the projection 23, the chain 20 will contact the slanted chain guide surface 90b and begin to move the movable plate 82 from the normal rest position to the shifting or actuating position (e.g., as shown in FIG. 9). The chain 20 will continue moving upwardly. As the chain 20 continues moving upwardly, the movable plate 82 will move completely into the actuating or shifting position illustrated in FIG. 9. Substantially simultaneously, the new arrangement of movable plate 82 will push the chain 20 actively onto the larger sprocket 24. In particular, the portion of the chain 20 on the smaller sprocket 22 will contact the first chain contact surface 90a to hold the movable plate 82 in the actuating position while the second chain contact surface 92a pushes the chain 20 aggressively onto the larger sprocket 24 while the chain 20 is being moved upwardly by the projection 23. The chain guide portion 26 will remain substantially in the shifted/extended position illustrated in FIGS. 7-11, while this movement of the movable plate 82 occurs. However, movement of the chain guide portion 26 and the movable plate 82 preferably happens substantially simultaneously. In other words, during an up shift, the chain guide portion 26 will move from the intermediate position to the extended/shifted position, the chain 20 will be lifted by one of the projections 23 due to rotation of the sprocket 24 having the projections 23, and the movable plate 82 will pivot from the normal rest position to the actuating position substantially simultaneously on order to smoothly shift the chain 20 to the larger sprocket 24.

Figure 11:
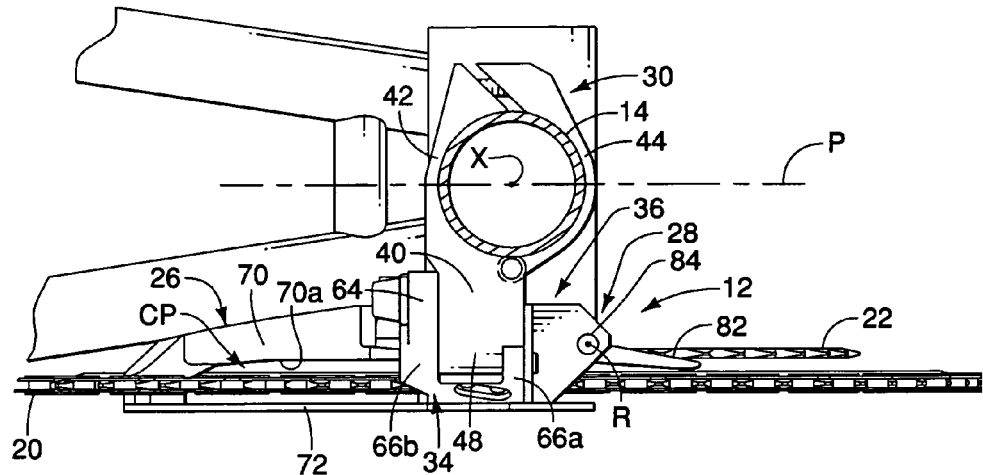
FIG. 11 is a top plan view of the front derailleur illustrated in FIG. 2, with the chain completely shifted to the larger front sprocket and the chain guide portion in the extended position, and with the pushing mechanism moved pack to the normal rest position.
Figure 12:
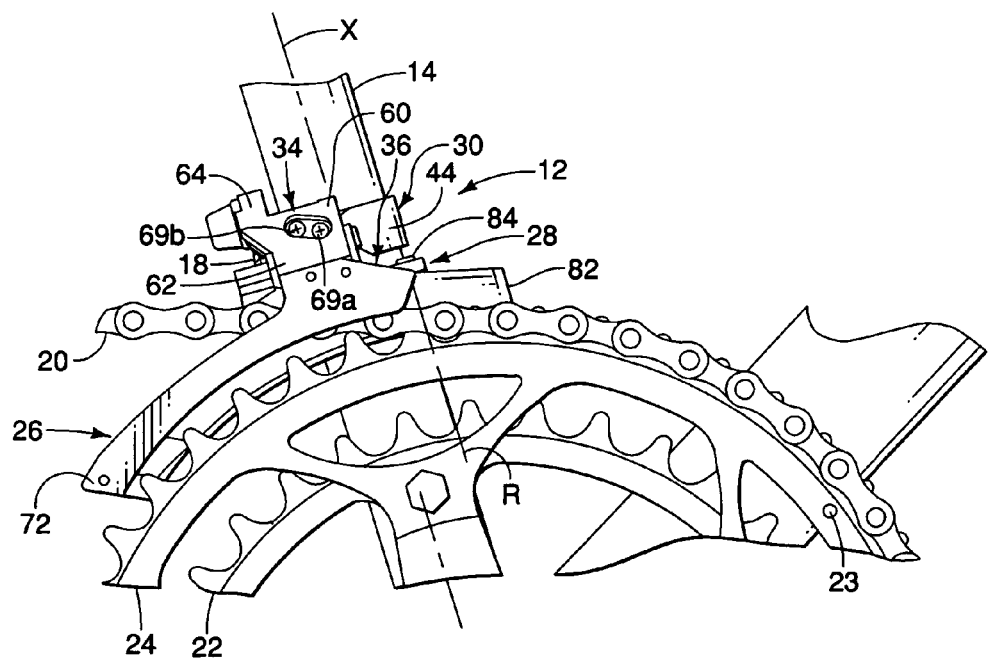
FIG. 12 is a side elevational view of the front derailleur illustrated in FIG. 11.

Once the chain 20 is reliably engaged with the larger sprocket 24 (e.g., FIG. 9) and the rider pedals sufficiently to disengage the first chain contact surface 90a from the chain 20, the movable plate 82 will move back to the normal rest position and the up shift will be complete as illustrated in FIGS. 11 and 12. In other words, the movable plate 82 moves in a see-saw movement back and forth from the normal rest position to the actuating position and back to the normal rest position during an up shift.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle front derailleur comprising:
a base member configured to be fixedly coupled to a bicycle frame;
a movable member having a chain guide portion; and
a linkage assembly coupled between the base member and the movable member to move the chain guide portion between a retracted position and an extended position,
the chain guide portion including an inner chain guide element, an outer chain guide element non-movably coupled to the inner chain guide element and a movable plate pivotally coupled to the inner chain guide element to pivot about a pivot axis relative to the inner chain guide element in a see-saw movement, the outer chain guide element being spaced laterally outwardly from the inner chain guide element to form a chain receiving space therebetween that defines a chain path,
the movable plate including a first chain engagement surface and a second chain engagement surface with the first and second chain engagement surfaces being movably arranged and configured with respect to the inner chain guide element such that the second chain engagement surface moves laterally outward into the chain path towards a center of the chain path relative to the inner chain guide member when the first chain engagement surface is moved laterally inward away from the center of the chain path relative to the inner chain guide member, the movable plate being chain activated such that the first chain engagement surface moves laterally inwardly away from the center of the chain path in response to contact with a chain in the chain receiving space and the second chain engagement surface pushes the chain laterally outward relative to the inner chain guide element while the first chain engagement surface moves laterally inward away from the center of the chain path.

2. The bicycle front derailleur according to claim 1, wherein
the movable plate includes a slanted surface that tapers from the first chain engagement surface in a direction away from the center of the chain path of the chain guide element relative to the first chain engagement surface.

3. The bicycle front derailleur according to claim 1, wherein
the first chain engagement surface of the movable plate is wider than the second chain engagement surface as measured in a direction parallel to the pivot axis of the movable plate.

4. The bicycle front derailleur according to claim 3, wherein
the movable plate includes a slanted surface that tapers from the first chain engagement surface in a direction away from the center of the chain path of the chain guide element relative to the first chain engagement surface.

5. The bicycle front derailleur according to claim 4, wherein
the movable plate is normally biased about the pivot axis to a normal rest position in which the first chain engagement surface is disposed closer to the center of the chain path of the chain guide element than the second chain engagement surface.

6. The bicycle front derailleur according to claim 1, wherein
the pivot axis extends in a substantially vertical direction relative to the bicycle frame when the base member is fixedly coupled to the bicycle frame.

7. The bicycle front derailleur according to claim 1, wherein
the movable plate is normally biased by a biasing element about the pivot axis to a normal rest position in which the first chain engagement surface is disposed closer to the center of the chain path of the chain guide element than the second chain engagement surface.

8. The bicycle front derailleur according to claim 1, wherein
the movable plate is coupled in a non-cable operated arrangement.

9. The bicycle front derailleur according to claim 1, wherein
the movable plate is separated from the base member and the linkage assembly such that the movable plate moves independently of movement of the linkage assembly.

10. The bicycle front derailleur according to claim 1, wherein the inner chain guide element has a chain contact surface that faces the outer chain guide element, and the first chain engagement surface of the movable plate is arranged to at least partially protrude into the chain receiving space when in an initial rest position and the second chain engagement surface of the movable plate is arranged to be at least partially aligned with the chain contact surface of the inner chain guide element or spaced out of the chain receiving space when in the initial rest position.

11. The bicycle front derailleur according to claim 10, wherein the movable plate is normally biased by a biasing element about the pivot axis to the normal rest position.

12. The bicycle front derailleur according to claim 11, wherein the movable plate includes a slanted surface that tapers from the first chain engagement surface in a direction away from the center of the chain path of the chain guide element relative to the first chain engagement surface.

13. The bicycle front derailleur according to claim 12, wherein the first chain engagement surface of the movable plate is wider than the second chain engagement surface as measured in a direction parallel to the pivot axis of the movable plate.

14. The bicycle front derailleur according to claim 1, wherein the pivot axis is non-movable relative to the inner and outer chain guide element.

15. The bicycle front derailleur according to claim 1, wherein the pivot axis is located between the first and second chain engagement surfaces of the movable plate as viewed in a direction perpendicular to the first chain engagement surface.

* * * * *